July 23, 1940.  E. C. WEIHER  2,208,807
CLUTCH LOCK
Filed Sept. 21, 1937   2 Sheets-Sheet 1

E. C. Weiher
INVENTOR.

BY
ATTORNEYS.

July 23, 1940.  E. C. WEIHER  2,208,807
CLUTCH LOCK
Filed Sept. 21, 1937  2 Sheets-Sheet 2

E. C. Weiher
INVENTOR.

BY
ATTORNEYS.

Patented July 23, 1940

2,208,807

UNITED STATES PATENT OFFICE 2,208,807

CLUTCH LOCK

Edward C. Weiher, Colorado Springs, Colo.

Application September 21, 1937, Serial No. 164,959

1 Claim. (Cl. 192—53)

This invention relates to a device designed for automatically and positively locking the clutch of a motor vehicle to the fly wheel thereof, thereby eliminating any possibility of the clutch slipping when the motor vehicle is operating at high speed or on a steep grade.

An object of the invention is to provide a device of this character which will be automatically moved to its inactive position with the operation of the clutch pedal to release the clutch, and one which will not in any way interfere with the operation of the clutch.

Another object of the invention is to provide a clutch locking mechanism of this character which will remain in its inactive position under normal conditions, but will move to lock the clutch to the fly wheel in the event that the clutch slips.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
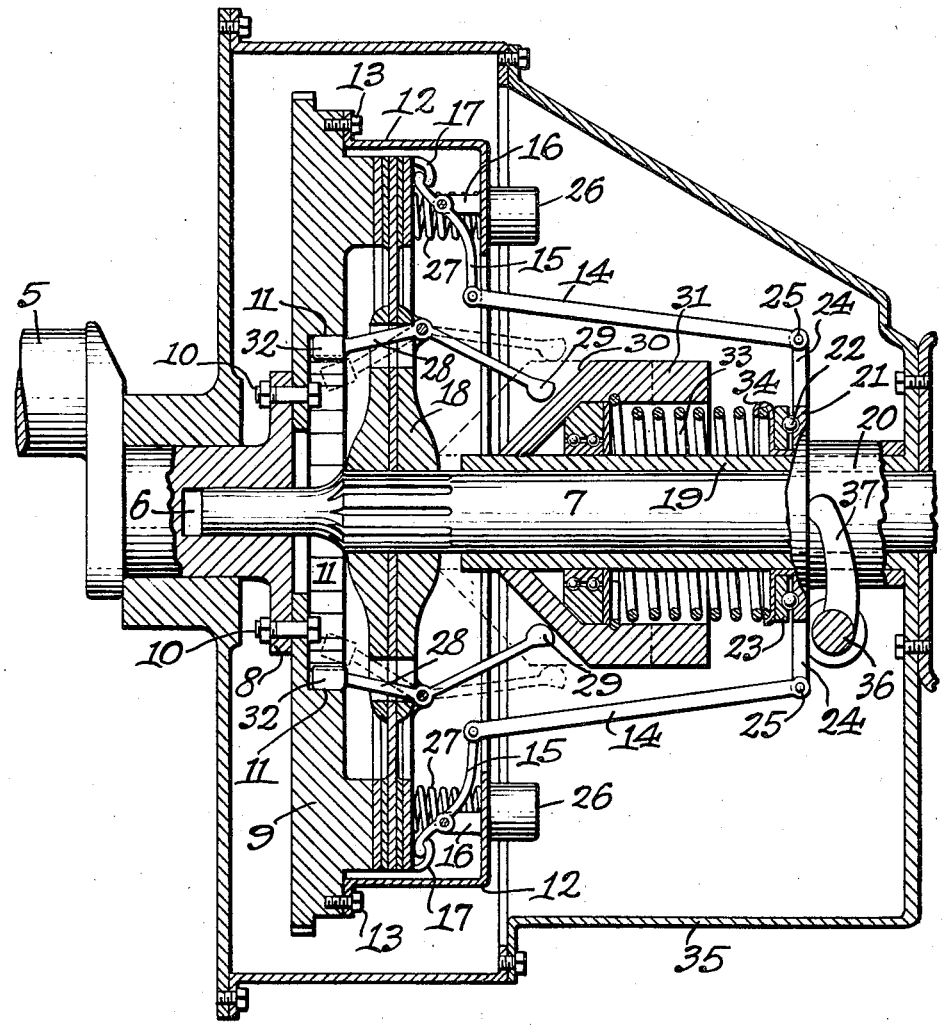
Figure 1 is a longitudinal sectional view through a clutch and clutch housing, the clutch being equipped with a clutch lock, constructed in accordance with the invention.

Referring to the drawings in detail, the reference character 5 designates the crank shaft of a motor vehicle, which is formed with a socket 6 into which one end of the propeller or drive shaft 7 extends, the shaft 7 being of the usual and well known construction and supplied with a pinion which transmits movement to the usual ring gear forming a part of the rear end structure.

As clearly shown by Figure 1 of the drawings, the inner end of the crank shaft 5 is formed with an annular flange 8 to which the fly wheel 9 is bolted, as by means of the bolts 10.

Figure 2:
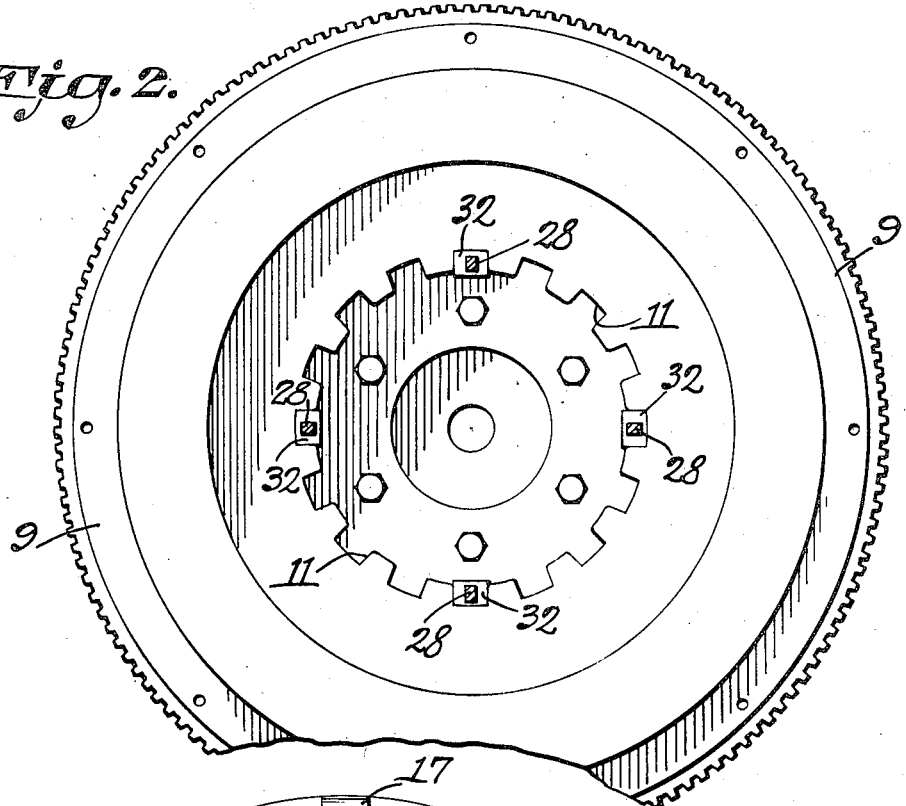
Figure 2 is an elevational view illustrating the construction of the fly wheel, the locking arms being shown in section.
Figure 3:
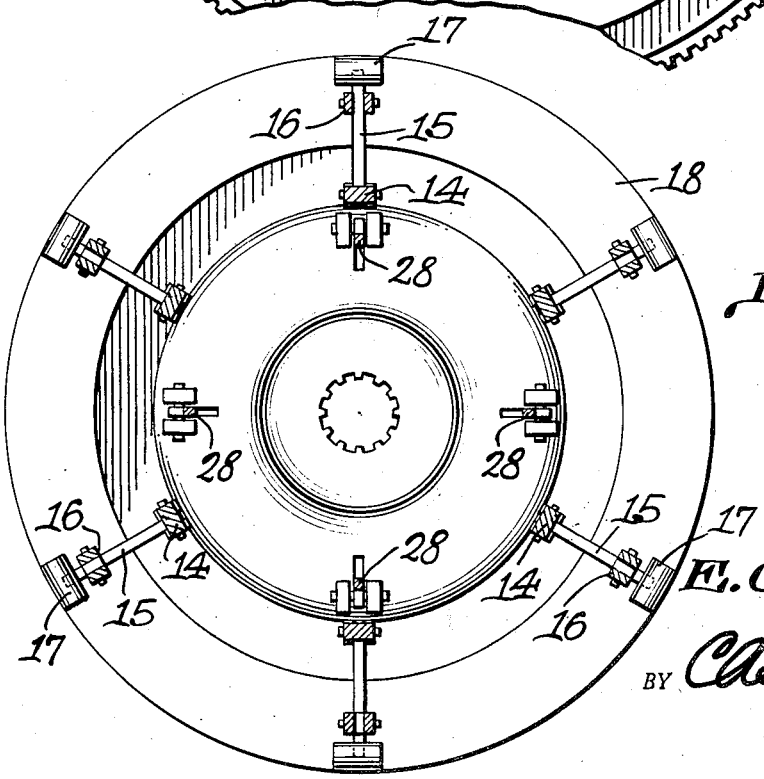
Figure 3 is an elevational view of the clutch member, the clutch operating levers being shown in section.

To adapt the fly wheel for use in connection with the present invention, the usual central opening thereof has its wall formed with notches 11 spaced equidistantly apart, as clearly shown by Figure 2 of the drawings.

The reference character 12 designates the clutch plate cover which is bolted to the fly wheel, by means of the bolts 13, the clutch plate cover being provided with an enlarged opening, through which the links 14 extend, the links 14 being connected with the levers 15 that in turn are pivotally supported on the arms 16 that extend inwardly from the clutch plate cover 12, as shown by Figure 1 of the drawings. The free ends of the levers 15 are curved, and fit under the curved plates 17 carried by the clutch plates, so that movement of the levers 15, will act to move the clutch plates into and out of engagement with the fly wheel. The clutch, which is indicated generally by the reference character 18, is secured to the shaft 7, to rotate therewith.

Slidably mounted on the tubular bearing 19 in which the shaft 7 operates, is a collar indicated by the reference character 20 which collar is formed with an annular flange 21 formed with a groove in which the ball bearings 22 operate the ball bearings also operating in a groove formed in the disk 23 supported adjacent thereto.

Extending from the annular flange 21, are arms 24, the arms being formed with cut-out portions to accommodate the rear ends of the links 14, the links being pivotally connected with the arms 24, by means of the pins 25. The clutch plate cover 12 is formed with housings 26 into which the coiled springs 27 extend, the coiled springs also contacting with the clutch to normally urge the clutch plates together. As clearly shown by Figure 1 of the drawings, the clutch 18 is formed with openings through which the arms 28 extend, the arms being pivotally mounted on the clutch member 18, the rear ends of the arms being formed with enlargements 29 that move over the inclined surface 30 of the operating collar 31.

The forward ends of the arms 28 are formed with enlargements 32 that are adapted to move into the notches 11 of the fly wheel, locking the clutch and fly wheel together.

The coiled spring 33 is mounted within the operating collar 31, and has one end thereof secured to the collar 31, the opposite end of the coiled spring being secured to the disk 34 to the end that the normal action of the spring will be to move the collar 31 and disk 34, towards each other. Since disk 34 is secured against movement, the collar 31 will be moved longitudinally of the tubular bearing 19, disengaging the arms and operating collar. Extending into the clutch housing, which is indicated by the reference character 35, is the operating shaft 36 to which the operating pedal is connected. Mounted on the inner end of the shaft 36 is the fork 37 that engages the flange 21 of the collar 20 to move the collar 20 forwardly to operate the clutch to disengage the clutch and fly wheel.

In the operation of the device, assuming that the clutch is in a position as shown by Figure 1 of the drawings, and the arms 28 are resting on portions of the fly wheel between the notches. In the event that the clutch slips, it will be obvious that the arms 28 will move into the notches, due to the centrifugal force, locking the clutch to the fly wheel.

When it is desired to release the clutch, the shaft 36 is operated by the usual pedal, whereupon the links 14 are moved inwardly operating the lever 15 to move the clutch out of engagement with the fly wheel. With this movement of the links 14, the operating collar 31 is moved inwardly and the inclined surface 30 thereof moves against the rear ends of the arms 28. As the rear end of the arms 28 move upwardly over the inclined surface 30, the forward ends of the arms 28 are moved inwardly disengaging the fly wheel.

When the clutch pedal is released, the springs 27 will act to return the clutch to a position where it engages the fly wheel. If the forward ends of the arms 28 do not move into the notches, they will rest on the portions of the fly wheel between the notches, and with a slight movement of the fly wheel with respect to the clutch, the forward ends of the arms 28 will find their way into the notches, locking the clutch and fly wheel together.

I claim:

The combination with the clutch and fly wheel of a motor vehicle, said fly wheel having notches, of a locking means adapted to lock the fly wheel and clutch together, said locking means comprising arms pivotally mounted on the clutch at points intermediate the arms, enlargements on the forward ends of the arms and adapted to move into the notches by centrifugal force when the clutch rotates, and means cooperating with the rear ends of the arms for moving the arms to their inactive positions.

EDWARD C. WEIHER.